United States Patent
Porto et al.

(10) Patent No.: US 7,359,928 B2
(45) Date of Patent: Apr. 15, 2008

(54) HARDWARE QUANTUM GATE

(75) Inventors: Domenico Porto, Catania (IT); Marco Branciforte, Catania (IT); Lucio Ticli, San Giovanni la Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 758 days.

(21) Appl. No.: 10/701,150

(22) Filed: Nov. 4, 2003

(65) Prior Publication Data

US 2004/0130956 A1 Jul. 8, 2004

Related U.S. Application Data

(63) Continuation-in-part of application No. 10/615,446, filed on Jul. 8, 2003.

(30) Foreign Application Priority Data

Jul. 8, 2002 (EP) ................... 02425447
Nov. 4, 2002 (EP) ................... 02425672

(51) Int. Cl.
   *G06F 7/00* (2006.01)
(52) U.S. Cl. ...................... 708/200; 359/107
(58) Field of Classification Search ................ 708/200, 708/191; 359/107, 108
   See application file for complete search history.

(56) References Cited

U.S. PATENT DOCUMENTS 6,317,766 B1 * 11/2001 Grover ........................ 708/400

7,069,282 B2 * 6/2006 Rizzotto et al. ............ 708/200
2004/0162640 A1 * 8/2004 Branciforte et al. ........ 700/262
2004/0179622 A1 * 9/2004 Calabro et al. ............. 375/242

FOREIGN PATENT DOCUMENTS

EP  1083520  3/2001
WO  01/67186  9/2001

OTHER PUBLICATIONS

Hioe et al., A Single Flux Quantum Logic Gate with High Functionality, Superconductor Science and Technology, IOP Publishing, Techno House, Bristol, GB, vol. 4, No. 11, Nov. 1, 1991, pp. 658-661, XP000561158.

(Continued)

*Primary Examiner*—Tan V. Mai
(74) *Attorney, Agent, or Firm*—Lisa K. Jorgenson; Allen, Dyer, Doppelt, Milbrath & Gilchrist, P.A.

(57) ABSTRACT

A hardware quantum gate for running quantum algorithms in a very fast manner exploits the fact that a large number of multiplications required by an entanglement operation of the quantum algorithm provides a null result since only one component per row of the entanglement matrix $U_F$ is not a null. The entanglement operation generates an entanglement vector by permuting pairs of opposite components of a linear superposition vector, depending on the value assumed by the function f. More specifically, if function f is null in correspondence to the vector identified by the first (leftmost) n qubits in common with the two n+1 qubit vectors, in which a pair of opposite components of the superposition vector is referred to, then the corresponding pair of components of the entanglement vector is equal to that of the superposition vector, otherwise it is the opposite.

23 Claims, 11 Drawing Sheets

OTHER PUBLICATIONS

Miquel et al., Factoring in a Dissipative Quantum Computer, Physical Review, A. General Physics, American Institute of Physics, New York, US, vol. 54, No. 4, Oct. 4, 1996, pp. 2605-2613, XP002181469.

Verdal et al., Basic of Quantum Computation, Progress in Quantum Electronics, Pergamon Press, Oxford, GB, vol. 22, Feb. 1998, pp. 1-39, XP000937713.

* cited by examiner

HARDWARE QUANTUM GATE

CROSS-REFERENCE TO RELATED APPLICATIONS

The present application is a continuation-in-part of U.S. patent application Ser. No. 10/615,446 filed Jul. 8, 2003, the entire contents of which are incorporated herein by reference.

FIELD OF THE INVENTION

The present invention relates to quantum algorithms, and more precisely, to a hardware quantum gate that performs, in particular, the entanglement operation of quantum algorithms.

BACKGROUND OF THE INVENTION

Quantum algorithms are global random searching algorithms based on the principles, laws and effects of quantum mechanics. They are used for controlling a process or for processing data in a database, and more specifically, for controlling a process that may include search-of-minima intelligent operations.

In a quantum search, each design variable is represented by a finite linear superposition of initial states, with a sequence of elementary unitary steps manipulating the initial quantum state |i> (for the input) such that a measurement of the final state of the system yields the correct output. Usually, three principle operators, i.e., linear superposition (coherent states), entanglement and interference, are used in the quantum search algorithm.

For a better understanding, a brief description of quantum search algorithms is provided. The problems solved by quantum algorithms may be stated as follows:

| Input | A function f: $\{0, 1\}^n \to \{0, 1\}^m$ |
|---|---|
| Problem | Find a certain property of f |

The structure of a quantum algorithm is outlined by a high level representation in the schematic diagram of FIG. 1.

The input of a quantum algorithm is always a function f from binary strings into binary strings. This function is represented as a map table, which defines for every string its image. Function f is first encoded into a unitary matrix operator $U_F$ depending on f properties. This operator calculates f when its input and output strings are encoded into canonical basis vectors of a Complex Hilbert Space: $U_F$ maps the vector code of every string into the vector code of its image by f.

---

BOX 1: UNITARY MATRIX $U_F$

A squared matrix $U_F$ on the complex field is unitary if its inverse matrix coincides with its conjugate transpose:

$$U_F^{-1} = U_F^=$$

A unitary matrix is always reversible and preserves the norm of vectors.

---

When the matrix operator $U_F$ has been generated, it is embedded into a quantum gate G, a unitary matrix whose structure depends on the form of matrix $U_F$ and on the problem to be solved. The quantum gate is the core of a quantum algorithm. In every quantum algorithm, the quantum gate acts on an initial canonical basis vector (the same vector can always be chosen) to generate a complex linear combination (called a superposition) of basis vectors as the output. The superposition contains all the information to answer the initial problem.

After the superposition has been created, a measurement takes place to extract this information. In quantum mechanics, measurement is a non-deterministic operation that produces as output only one of the basis vectors in the superposition. The probability of every basis vector being the output of a measurement depends on its complex coefficient (probability amplitude) in entering a complex linear combination.

The segmental action of the quantum gate and of the measurement forms the quantum block. The quantum block is repeated k times to produce a collection of k basis vectors. In measuring a non-deterministic operation, these basic vectors would not be necessarily identical and each one of them will encode a piece of the information needed to solve the problem. The last part of the algorithm includes interpretation of the collected basis vectors to get the right answer for the initial problem with a certain probability.

The behavior of the encoder block is described in the detailed schematic diagram of FIG. 2. Function f is encoded into matrix $U_F$ in three steps.

Step 1: The map table of function f: $\{0,1\}^n \to \{0,1\}^m$ is transformed into the map table of the injective function $F: \{0,1\}^{n+m} \to \{0,1\}^{n+m}$ such that:

$$F(x_0, \ldots, x_{n-1}, y_0, \ldots, y_{m-1}) = (x_0, \ldots, x_{n-1}, f(x_0, \ldots, x_{n-1}) \oplus (y_0, \ldots, y_{m-1})) \quad (1)$$

---

BOX 2: XOR OPERATOR $\oplus$

The XOR operator between two binary strings $p$ and $q$ of length $m$ is a string $s$ of length $m$ such that the $i$-th digit of $s$ is calculated as the exclusive OR between the $i$-th digits of $p$ and $q$:

$$p = (p_0, \ldots, p_{n-1})$$
$$q = (q_0, \ldots, q_{n-1})$$
$$s = p \oplus q = ((p_0 + q_0) \bmod 2, \ldots, (p_{n-1} + q_{n-1}) \bmod 2))$$

---

The need to deal with an injective function comes from the requirement that $U_F$ is unitary. A unitary operator is reversible, so it cannot map two different inputs in the same output. Given that $U_F$ is the matrix representation of F, F is supposed to be infective. If the matrix representation of function f is directly used, a non-unitary matrix could be obtained since f could be non-injective. Injectivity is thus fulfilled by increasing the number of bits and considering function F instead of function f. Function f can always be calculated from F by putting $(y_0, \ldots, y_{m-1}) = (0, \ldots, 0)$ in the input string and reading the last m values of the output string.

Step 2: Function F map table is transformed into $U_F$ map table, following the following constraint:

$$\forall s \in \{0,1\}^{n+m} : U_F[\tau(s)] = \tau[F(s)] \quad (2)$$

The code map $\tau:\{0,1\}^{n+m}\to c^{2^{n+m}}$ ($c^{2^{n+m}}$ is the target Complex Hilbert Space) is such that:

$$\tau(0) = \begin{pmatrix}1\\0\end{pmatrix} = |0\rangle \quad \tau(1) = \begin{pmatrix}0\\1\end{pmatrix} = |1\rangle \quad (3)$$

$$\tau(x_0, \ldots, x_{n+m-1}) = \tau(x_0) \otimes \ldots \otimes \tau(x_{n+m-1}) = |x_0 \ldots x_{n+m-1}\rangle$$

---

BOX 3: VECTOR TENSOR PRODUCT ⊗

The tensor product between two vectors of dimensions h and k is a tensor product of dimension hk, such that:

$$|x\rangle \otimes |y\rangle = \begin{pmatrix}x_1\\ \vdots \\ x_h\end{pmatrix} \otimes \begin{pmatrix}y_1\\ \vdots \\ y_k\end{pmatrix} = \begin{pmatrix}x_1 y_1 \\ \vdots \\ x_1 y_k \\ \vdots \\ x_h y_1 \\ \vdots \\ x_h y_k\end{pmatrix}$$

Physical interpretation: If a component of a complex vector is interpreted as the probability amplitude of a system being in a given state (indexed by the component number, the tensor product between two vectors describes the joing probability amplitude of two systems being in a joint state.

---

EXAMPLES

Vector Tensor Products $$(0,0) \xrightarrow{\tau} \begin{pmatrix}1\\0\end{pmatrix} \otimes \begin{pmatrix}1\\0\end{pmatrix} = \begin{pmatrix}1\\0\\0\\0\end{pmatrix} = |00\rangle \quad (0,1) \xrightarrow{\tau} \begin{pmatrix}1\\0\end{pmatrix} \otimes \begin{pmatrix}0\\1\end{pmatrix} = \begin{pmatrix}0\\1\\0\\0\end{pmatrix} = |01\rangle$$

$$(1,0) \xrightarrow{\tau} \begin{pmatrix}0\\1\end{pmatrix} \otimes \begin{pmatrix}1\\0\end{pmatrix} = \begin{pmatrix}0\\0\\1\\0\end{pmatrix} = |10\rangle \quad (1,1) \xrightarrow{\tau} \begin{pmatrix}0\\1\end{pmatrix} \otimes \begin{pmatrix}0\\1\end{pmatrix} = \begin{pmatrix}0\\0\\0\\1\end{pmatrix} = |11\rangle$$

Code $\tau$ maps bit values into complex vectors of dimension 2 belonging to the canonical basis of $C^2$. Besides using a tensor product, $\tau$ maps the general state of a binary string of dimension n into a vector of dimension $2^n$ for reducing this state to the joint state of the n bits composing the register. Every bit state is transformed into the corresponding 2-dimensional basis vector, and then the string state is mapped into the corresponding $2^n$-dimensional basis vector by composing all bit-vectors through a tensor product. The tensor product is thus the vector counterpart of a state conjunction. Basis vectors are denoted using the notation $|i\rangle$. This notation is taken from the description of quantum mechanics.

Step 3: $U_F$ map table is transformed into $U_F$ using the following transformation rule:

$$[U_F]_{ij} = 1 \Leftrightarrow U_F|j\rangle = |i\rangle \quad (4)$$

which can be easily understood when considering vectors $|i\rangle$ and $|j\rangle$ as column vectors. Associating these vectors to the canonical basis, $U_F$ defines a permutation map of the identity matrix rows. In general, row $|j\rangle$ is mapped into row $|i\rangle$. This rule will be illustrated in detail in an example quantum algorithm: Grover's algorithm.

The core of the quantum block is the quantum gate, which depends on the properties of matrix $U_F$. The scheme in FIG. 3 gives a more detailed description of the quantum block. The matrix operator $U_F$ in FIG. 3 is the output of the encoder block represented in FIG. 2. Here, it becomes the input for the quantum block.

This matrix operator is first embedded into a more complex gate: the quantum gate G. Unitary matrix G is applied k times to an initial canonical basis vector $|i\rangle$ of dimension $2^{n+m}$. Every time, the resulting complex superposition $G|0 \ldots 01 \ldots 1\rangle$ of basis vectors is measured, and one basis vector $|x_i\rangle$ is produced as a result. All the measured basis vectors $\{|x_1\rangle, \ldots, |x_k\rangle\}$ are collected together. This collection is the output of the quantum block.

The intelligence of such algorithms is in the ability to build a quantum gate that is able to extract the information necessary to find the required property of f and to store it into the output vector collection. The structure of the quantum gate for every quantum algorithm will be discussed in detail, observing that a general description is possible. To represent quantum some special diagrams called quantum circuits are going to be used.

An example of a quantum circuit, relative to the so called Deutsch-Jozsa's quantum algorithm, is illustrated in FIG. 4. Every rectangle is associated to a matrix $2^n \times 2^n$, where n is the number of lines entering and leaving the rectangle. For example, the rectangle marked $U_F$ is associated to matrix $U_F$. Typically, matrix H represents a Hadamard rotation $$H = \frac{1}{\sqrt{2}}\begin{bmatrix}1 & 1 \\ 1 & -1\end{bmatrix} \quad (5)$$

Quantum circuits provide a high-level description of the gate, and using some of the transformation rules listed in FIGS. 5a-5f, it is possible to compile them into the corresponding gate-matrix.

---

BOX 4: MATRIX TENSOR PRODUCT ⊗

The tensor product between two matrices $X_{n \times m}$ and $Y_{h \times k}$ is a (block) matrix $(n \cdot h) \times (m \cdot k)$ such that:

$$X \otimes Y = \begin{bmatrix}x_{11}Y & \cdots & x_{1m}Y \\ \vdots & \cdots & \vdots \\ x_{n1}Y & \cdots & x_{nm}Y\end{bmatrix} \text{ with } X = \begin{bmatrix}x_{11} & \cdots & x_{1m} \\ \vdots & \cdots & \vdots \\ x_{n1} & \cdots & x_{nm}\end{bmatrix}$$

---

Example

Matrix Tensor Product $$\begin{bmatrix}1 & 2 \\ 3 & 4\end{bmatrix} \otimes \begin{bmatrix}5 & 6 \\ 7 & 8\end{bmatrix} = \begin{bmatrix}1 \cdot \begin{bmatrix}5 & 6\\7 & 8\end{bmatrix} & 2 \cdot \begin{bmatrix}5 & 6\\7 & 8\end{bmatrix} \\ 3 \cdot \begin{bmatrix}5 & 6\\7 & 8\end{bmatrix} & 4 \cdot \begin{bmatrix}5 & 6\\7 & 8\end{bmatrix}\end{bmatrix} = \begin{bmatrix}5 & 6 & 10 & 12 \\ 7 & 8 & 14 & 16 \\ 15 & 18 & 20 & 24 \\ 21 & 24 & 28 & 32\end{bmatrix}$$

It will be clearer how to use these rules when the first example of a quantum algorithm will be discussed in greater detail below.

The decoder block has the function to interpret the basis vectors collected after the iterated execution of the quantum block. Decoding these vectors means to retranslate them into binary strings and interpreting them directly if they already contain the answer to the starting problem. Alternatively, the vectors may be used as coefficient vectors for an equation system to get the searched solution. This part will not be discussed in any greater detail because it is relatively straightforward to understand by those skilled in the art.

Because of the particular importance of the Grover's quantum algorithm in the realization of controllers and data search algorithms in databases, a brief description of the Grover's algorithm will be given below. Grover's problem is stated as follows:

| Input | A function f: $\{0, 1\}^n \rightarrow \{0, 1\}$ such that $\exists x \in \{0, 1\}^n$: $(f(x) = 1 \wedge \forall y \in \{0, 1\}^n$: $x \neq y \Rightarrow f(y) = 0)$ |
|---|---|
| Problem | Find x |

In the Deutsch-Jozsa's algorithm there are two classes of input functions and it must be determined what class the input function belongs to. In this case the problem is almost identical in its form, even if it is more difficult because now we are dealing with $2^n$ classes of input functions (each function of the kind described forms a class).

The diagram of the Grover's algorithm is depicted in FIG. 6, and the gate equation is $$\Phi = [(D_n I) \cdot U_F]^h \cdot (^{n+1}H) \qquad (6)$$

Operator $D_n$ is called a diffusion matrix of order n and is responsible for interference in this algorithm. The diffusion matrix is defined as follows:

one qubit doubles the dimensions of the matrices. Thus, the number of elements (and products) increases exponentially.

A method of performing the superposition operation of the Grover's or Deutsch-Jozsa's quantum algorithm over an input set of vectors is disclosed in European Patent No. 1267304, which is assigned to the current assignee of the present invention. This method exploits the fact that any rotated vector, obtained performing the Hadamard rotation (on an input vector) contemplated by the superposition operation of these quantum algorithms can be easily encoded in a binary vector. Therefore, the successive tensor product of the rotated vectors for generating linear superposition vectors can be carried out by logic gates. This fact allows a noticeable time saving since logic gates are very fast.

However, this is not sufficient to significantly speed up running these quantum algorithms because the entanglement matrix $U_F$ is a $2^{n+1} \times 2^{n+1}$ square matrix, which implies a considerable computational weight both in the Grover's algorithm as well as in the Deutsch-Jozsa's algorithm.

Differently from other quantum algorithms, in the Grover's algorithm it is possible to iterate h times the entanglement and interference operations until the best solution is reached. An example of evolution of the Grover's algorithm with n=3 is given in FIG. 7a, in which basis vector and superposition, entanglement and interference output vectors are reported in order. Several iterations of entanglement and interference operations produce a better distribution of probability amplitudes.

Each value is a component on the output vector referred to a basis of vectors of n+1 qubits. There are couples or pairs of values having an opposite sign, referred to vectors of the basis having in common the first (leftmost) n qubits. For example, the values 0.625 and −0.625 are respectively referred to as vectors |0110> and |0111>, respectively. Each pair of elements having an opposite sign represents the probability amplitude of a certain element of the database.

| $D_n$ | $\|0 \ldots 0>$ | $\|0 \ldots 1>$ | $\ldots$ | $\|i>$ | $\ldots$ | $\|1 \ldots 0>$ | $\|1 \ldots 1>$ |
|---|---|---|---|---|---|---|---|
| $\|0 \ldots 0>$ | $-1 + 1/2^{n-1}$ | $1/2^{n-1}$ | $\ldots$ | $1/2^{n-1}$ | $\ldots$ | $1/2^{n-1}$ | $1/2^{n-1}$ |
| $\|0 \ldots 1>$ | $1/2^{n-1}$ | $-1 + 1/2^{n-1}$ | $\ldots$ | $1/2^{n-1}$ | $\ldots$ | $1/2^{n-1}$ | $1/2^{n-1}$ |
| $\ldots$ | $\ldots$ | $\ldots$ | $\ldots$ | $\ldots$ | $\ldots$ | $\ldots$ | $\ldots$ |
| $\|i>$ | $1/2^{n-1}$ | $1/2^{n-1}$ | $\ldots$ | $-1 + 1/2^{n-1}$ | $\ldots$ | $1/2^{n-1}$ | $1/2^{n-1}$ |
| $\ldots$ | $\ldots$ | $\ldots$ | $\ldots$ | $\ldots$ | $\ldots$ | $\ldots$ | $\ldots$ |
| $\|1 \ldots 0>$ | $1/2^{n-1}$ | $1/2^{n-1}$ | $\ldots$ | $1/2^{n-1}$ | $\ldots$ | $-1 + 1/2^{n-1}$ | $1/2^{n-1}$ |
| $\|1 \ldots 1>$ | $1/2^{n-1}$ | $1/2^{n-1}$ | $\ldots$ | $1/2^{n-1}$ | $\ldots$ | $1/2^{n-1}$ | $-1 + 1/2^{n-1}$ |

Grover's algorithm may be implemented in routines for searching a desired item in a set, by representing in vector form each item of the set forming an input set of vectors, and applying a Grover's algorithm to this set of vectors. The output vector represents the desired item.

The implementation of the Grover's algorithm clearly implies the calculation of several vector products. In fact, all qubits must be multiplied by matrix H, then by the entanglement matrix $U_F$ and all qubits but the latter must be multiplied by matrix $D_n$.

These multiplications could be carried out via software, but it is quite evident that the number of qubits of a quantum algorithm is very critical in terms of computational speed. In fact, referring to the scheme in FIG. 6, the addition of only For the considered example, the value 0.625 is the probability of the element associated to vector |011> after 3 iterations (h=3).

The algorithm may be iterated as far as a certain quantity is to be minimized, calculated as a function of the components of the output vector, and is smaller than a certain pre-established value. For instance, this quantity can be the Shannon entropy:

$$S(h) = -\sum_{k=1}^{2^{n+1}} \|q_k(h)\|^2 \log \|q_k(h)\|^2 \qquad (7)$$

where $q_k(h)$ is the k-th component of the output vector Q taken after h iterations.

The components of the output vector obtained after h=15 iterations are represented in FIG. 7b. From FIG. 7b it is clear that the element of the database to be found is associated with vector |011>, and after 15 iterations the Grover's quantum algorithm will find it with a probability of about 0.69.

From the above discussion it is evident that the problem of the large number of computations is even more crucial in the Grover's algorithm than in the Deutsch-Jozsa's algorithm because multiplication by the entanglement matrix $U_F$ and the interference matrix $D_nI$ might be repeated many (h) times to output the best result.

SUMMARY OF THE INVENTION

In view of the foregoing background, an object of the present invention is to provide a hardware quantum gate for running quantum algorithms in a very fast manner.

The present invention exploits the fact that a large number of multiplications required by the entanglement operation of quantum algorithms give a null result, because only one component per row of the entanglement matrix $U_F$ is not a null. The entanglement operation generates an entanglement vector by permuting the places of pairs of opposite components of a linear superposition vector, depending on the value assumed by the function f(.). More specifically, if function f(.) is null in correspondence to the vector identified by the first (leftmost) n qubits in common with the two n+1 qubit vectors to which a pair of opposite components of which the superposition vector is referred to, then the corresponding pair of components of the entanglement vector is equal to that of the superposition vector. Otherwise, it is the opposite.

Therefore, it is not necessary to calculate the entanglement matrix $U_F$ to generate an entanglement vector from a superposition vector, but it is sufficient to copy or invert components of a superposition vector to generate corresponding components of an entanglement vector, depending on the values of the function f(.) processed by the quantum algorithm. This can be easily done using switches input with a pair of components having an opposite value of a superposition vector.

More precisely, the object of the present invention is to provide a quantum gate for running quantum algorithms using a certain binary function defined on a space having a basis of vectors of n qubits, composed of a superposition subsystem carrying out a superposition operation over components of input vectors for generating components of linear superposition vectors referred on a second basis of vectors of n+1 qubits. An entanglement subsystem carries out an entanglement operation over components of the linear superposition vectors for generating components of entanglement vectors. An interference subsystem carries out an interference operation over components of the entanglement vectors for generating components of output vectors.

The entanglement subsystem comprises a command circuit generating a number ($2^n$) of logic command signals encoding the values of the binary function in correspondence to the vectors of the first basis, and an array of multiplexers input with the logic command signals that generate, for each superposition vector, corresponding signals representing components of an entanglement vector.

Each component of the entanglement vector referred to a respective vector of the second basis is equal to the corresponding component of the respective superposition vector if the binary function is null in correspondence to the vector of the first basis formed by the first n qubits of the respective vector of the second basis. Alternatively, each component may be equal to the opposite of the corresponding component of the respective superposition vector if the binary function is not a null in correspondence to the vector of the first basis formed by the first n qubits of the respective vector of the second basis.

BRIEF DESCRIPTION OF THE DRAWINGS

The particular aspects and advantages of the invention will become more evident through the following description of several important embodiments and by referring to the attached drawings, wherein.

DETAILED DESCRIPTION OF THE PREFERRED EMBODIMENTS

The quantum gate of the invention is suitable for a fast running quantum algorithm applied over a set of input vectors, such as for example, decision making or data search routines based on the Deutsch-Jozsa's algorithm or the Grover's algorithm. It is composed of a superposition subsystem carrying out a linear superposition, an entanglement subsystem carrying out an entanglement operation, and an interference subsystem carrying out an interference operation according to the quantum algorithm to be implemented.

An essential feature of the quantum gate of the invention includes the fact that the entanglement subsystem does not multiply a superposition vector for the entanglement matrix $U_F$, but generates components of an entanglement vector simply by copying or inverting respective components of the superposition vector depending on values of the function f(.).

This allows a relevant reduction of the number of multiplications with respect to known methods, and can be carried out using multiplexers. For the sake of simplicity, the hardware quantum gate of the invention will be described in reference to the Grover's quantum algorithm for n=3, though what will be discussed may be easily repeated for other quantum algorithms (in particular, the Deutsch and the Deutsch-Jozsa's algorithm) whose entanglement operation includes a permutation of components of a superposition vector.

A hardware quantum gate of the invention suitable for running the Grover's algorithm with any number of iterations is substantially composed of two parts. Part I: (analog) Calculation step-by-step of the output values. This part is divided in the following subsections: I-a: Entanglement; I-b and I-c: Interference. Part II: (digital) Entropy evaluation, storage of vectors for iterations and output display. This part provides also the first basis of vectors.

Figure 1:
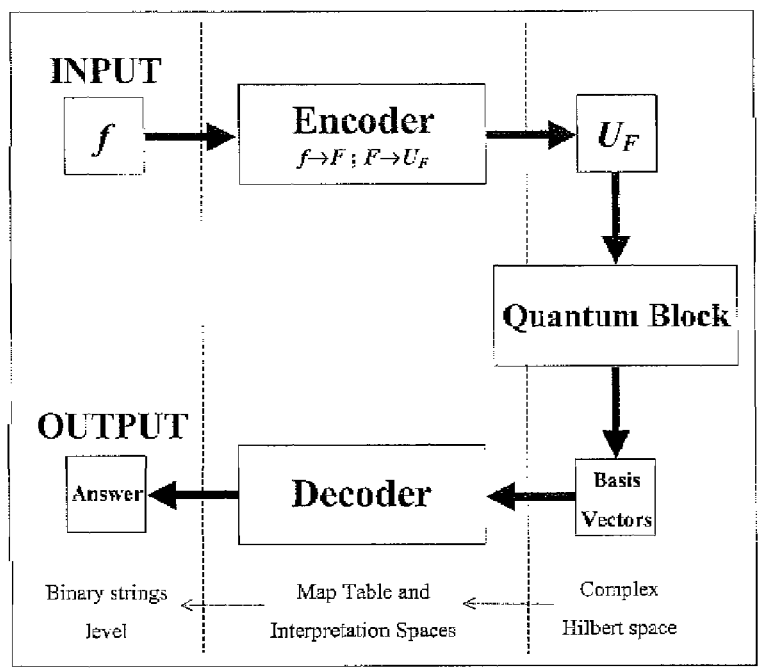
FIG. 1 is a block diagram of quantum algorithm in accordance with the prior art.
Figure 2:
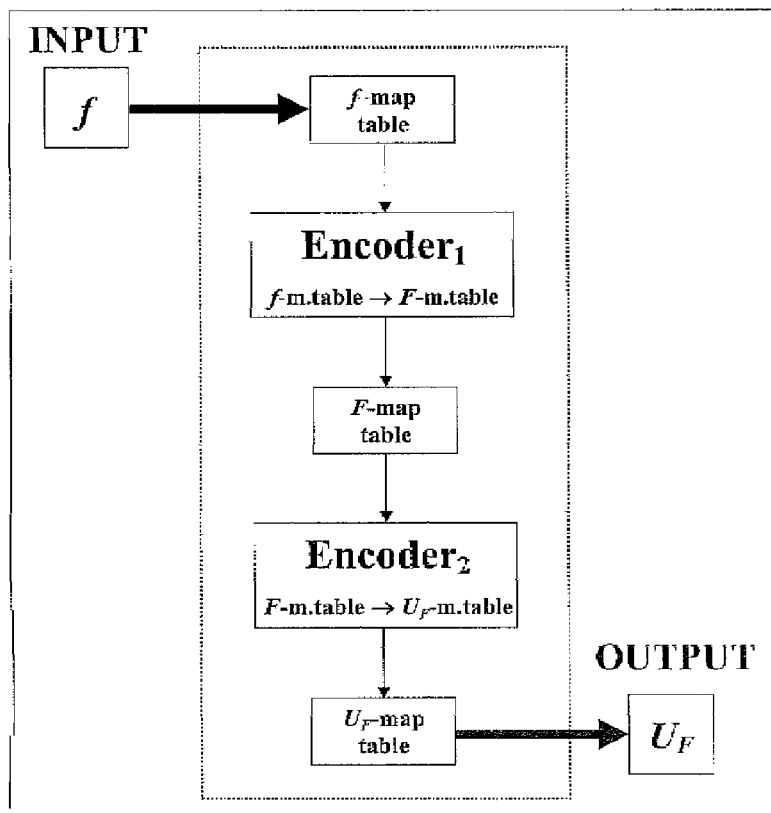
FIG. 2 is a block diagram of an encoder in accordance with the prior art.
Figure 3:
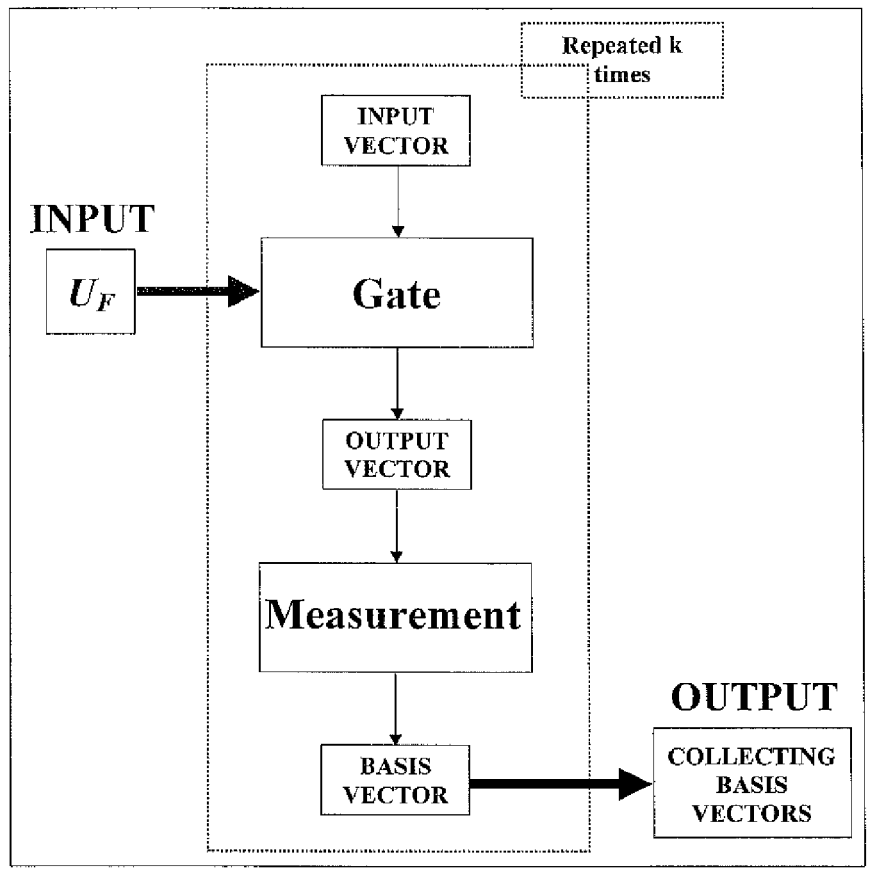
FIG. 3 is a general structure of the quantum algorithm as shown in FIG. 1.
Figure 4:
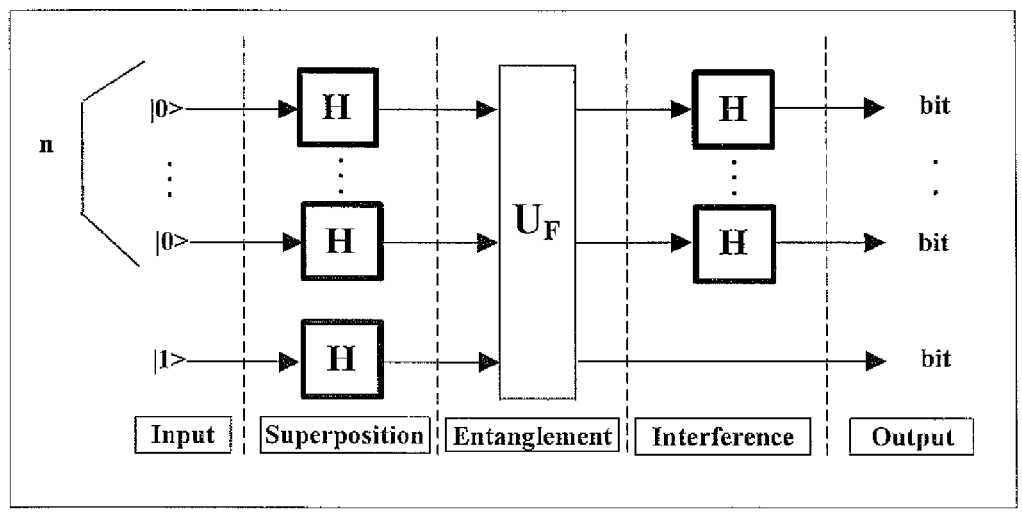
FIG. 4 is a circuit for a Deutsch-Jozsa's quantum gate in accordance with the prior art.
Figure 5A:
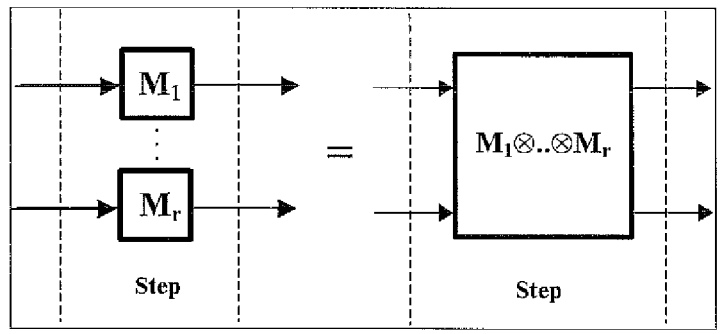
FIG. 5a shows an example of a tensor product transformation in accordance with the prior art.
Figure 5B:
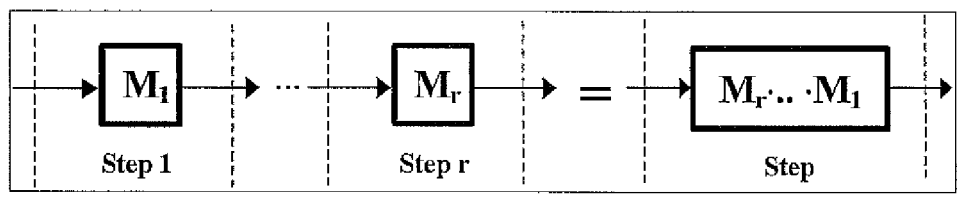
FIG. 5b shows an example of dot product transformation in accordance with the prior art.
Figure 5C:
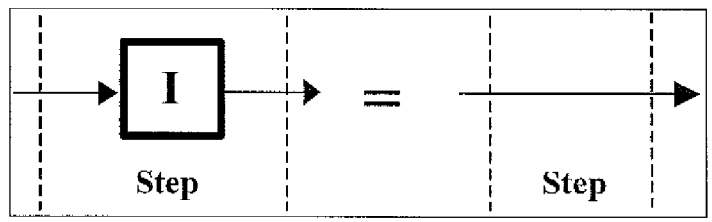
FIG. 5c shows the identity transformation in accordance with the prior art.
Figure 5D:
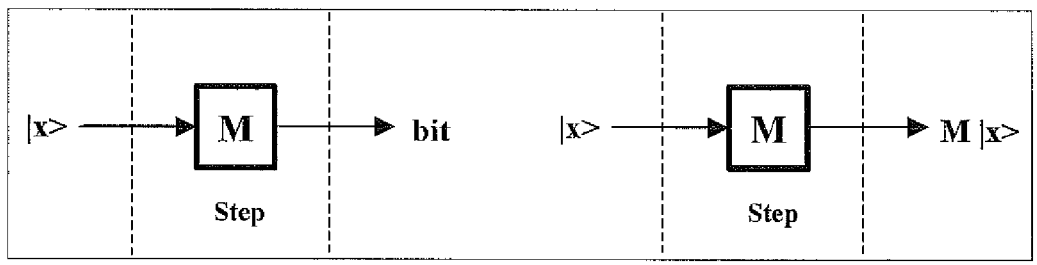
FIG. 5d shows an example of the propagation rule in accordance with the prior art.
Figure 5E:
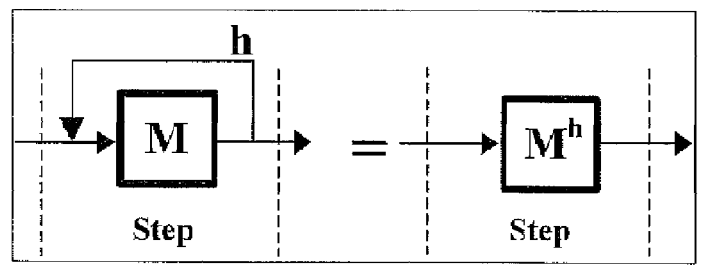
FIG. 5e shows an example of the iteration rule in accordance with the prior art.
Figure 5F:
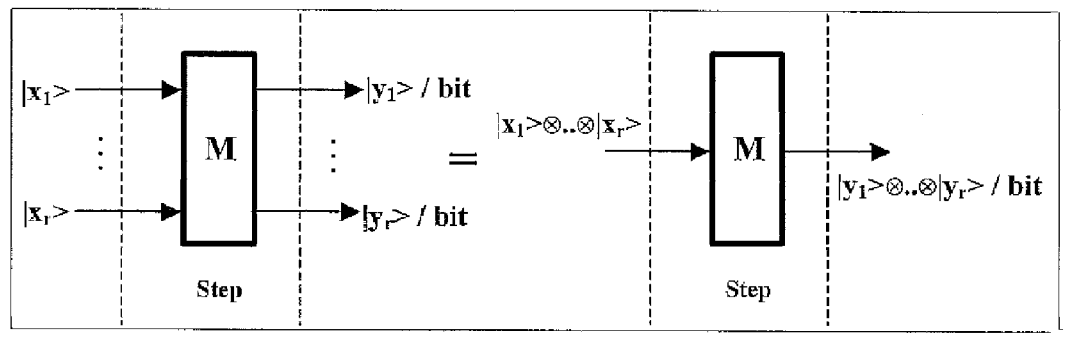
FIG. 5f explains the input/output tensor rule in accordance with the prior art.
Figure 6:
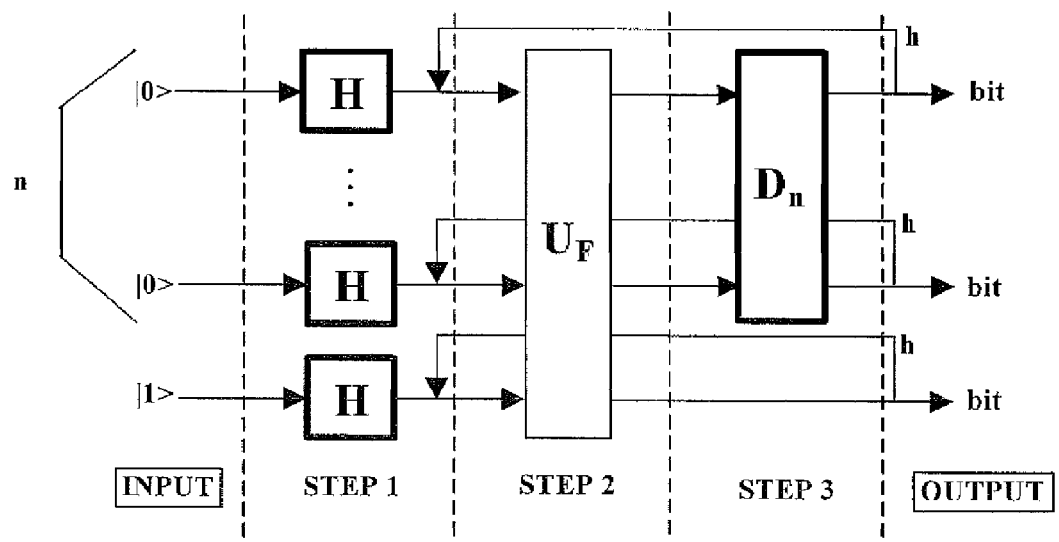
FIG. 6 is an example of a circuit forming a Grover's quantum gate in accordance with the prior art.
Figure 7A:
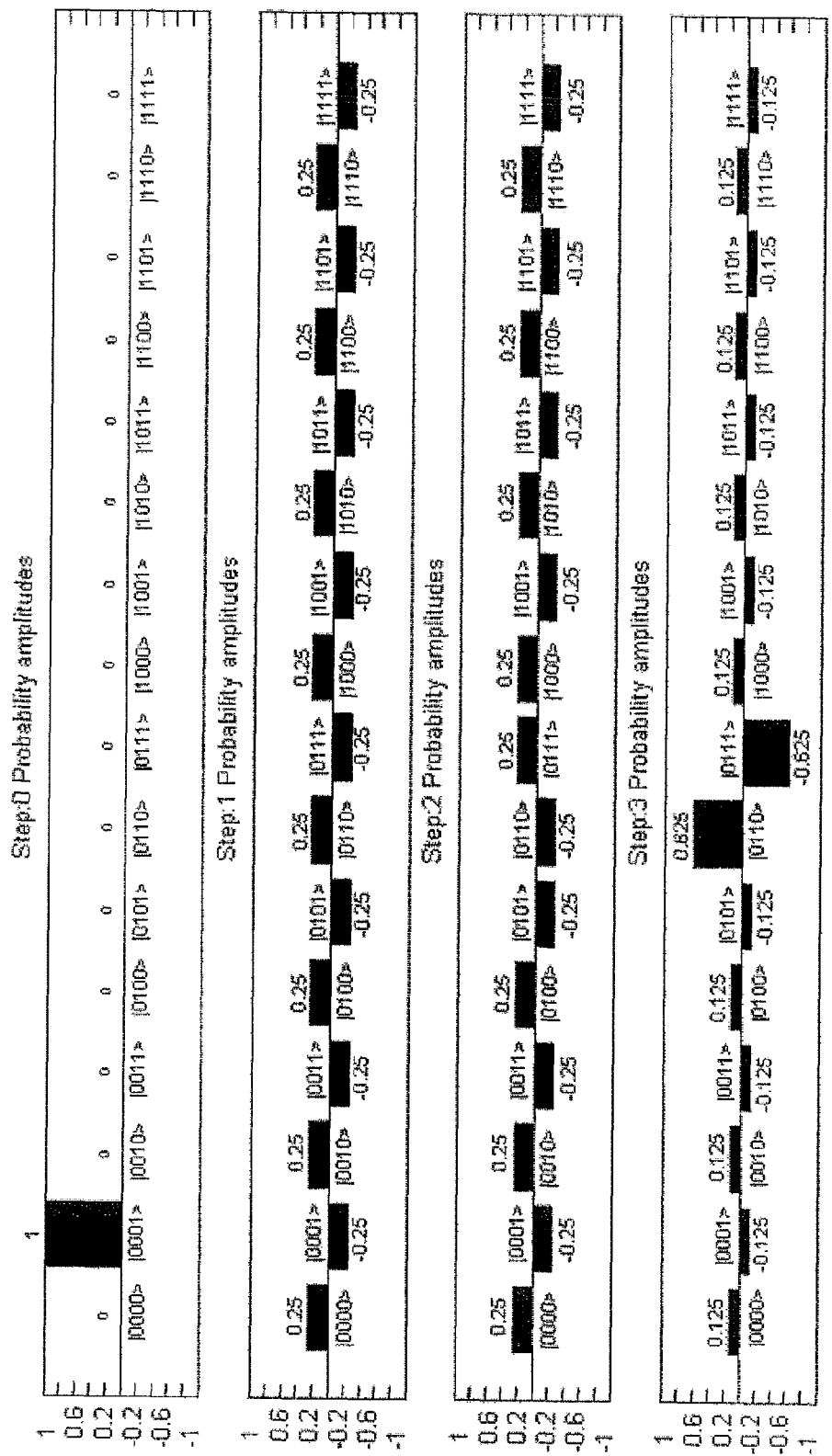
FIGS. 7a and 7b illustrate the evolution of the Grover's quantum algorithm in accordance with the prior art.
Figure 7B:
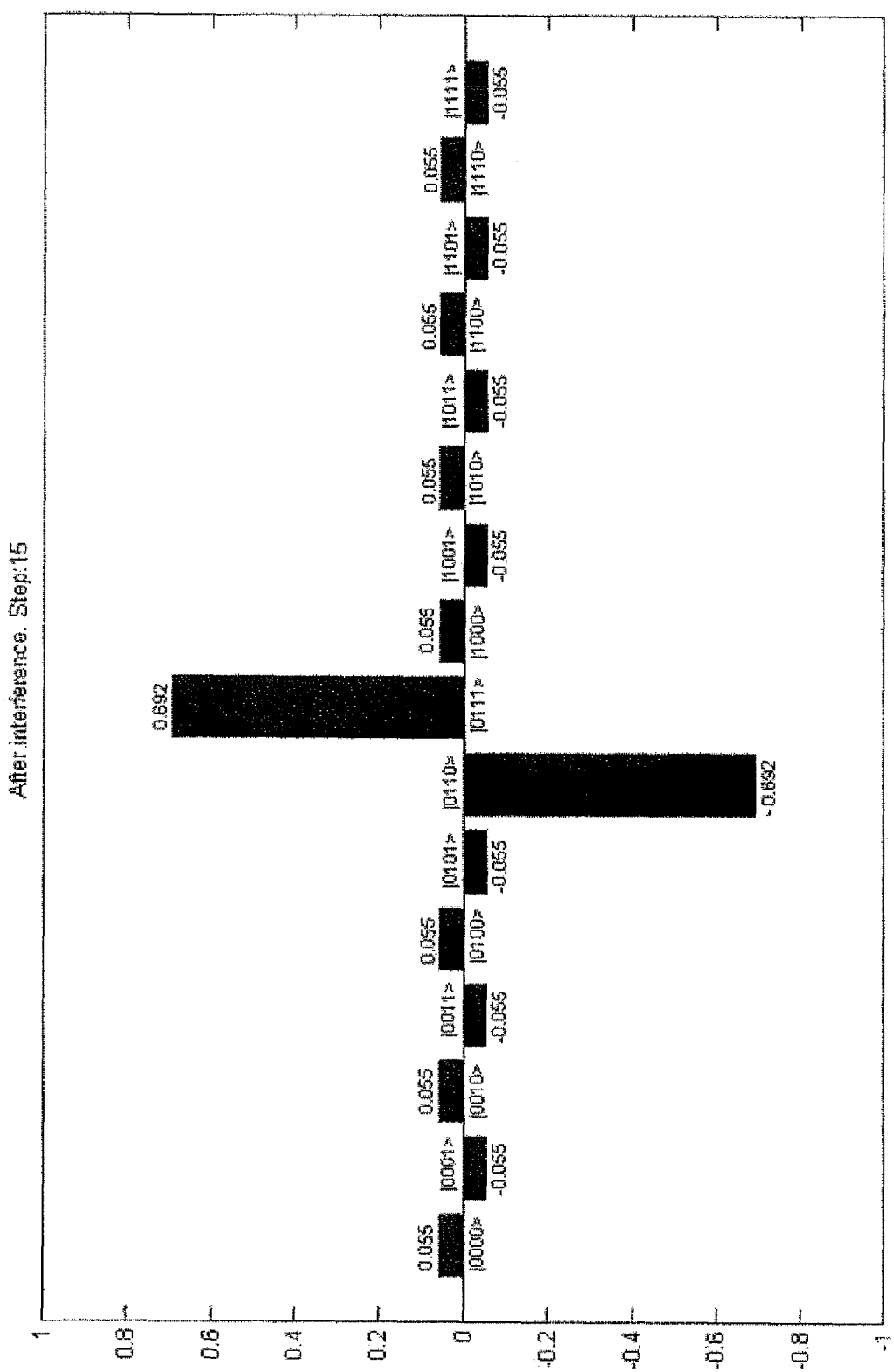
Figure 8:
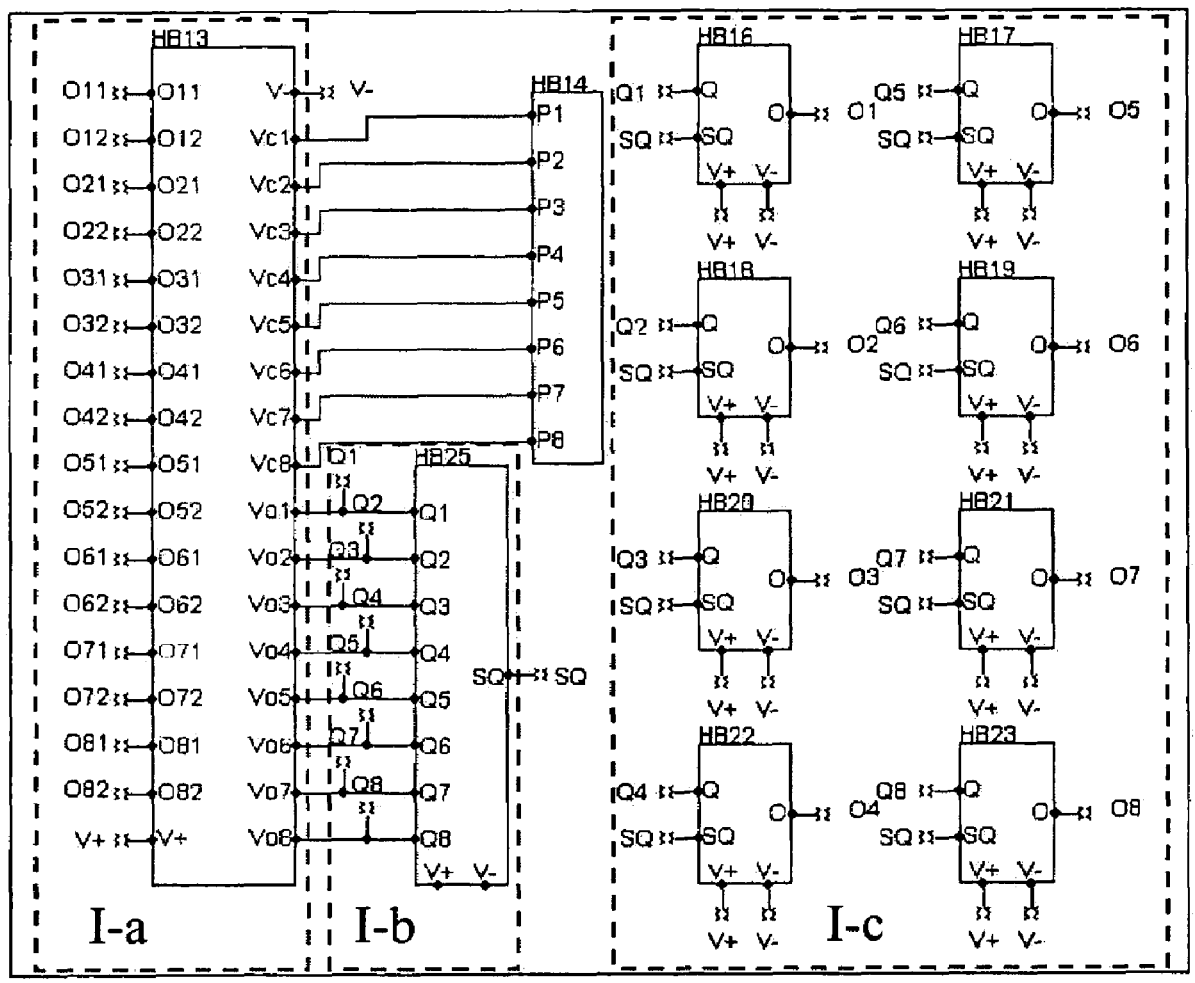
FIG. 8 is a detailed view of entanglement and interference subsystems of the quantum gate in accordance with the present invention.

The analog part of this scheme for a three-qubits quantum gate is depicted in FIG. 8. A command circuit HB14 generates eight command signals Vc1, . . . , Vc8 each representing a value of the function f(.) on a respective vector of the first basis. An array of multiplexers HB13 is input with voltage signals 011, . . . , 082 representing the sixteen components of a linear superposition vector and generates signals Vo1, . . . , Vo8 representing only the even or the odd components of an entanglement vector. Let us suppose that these signals represent the odd components of an entanglement vector.

Figure 9:
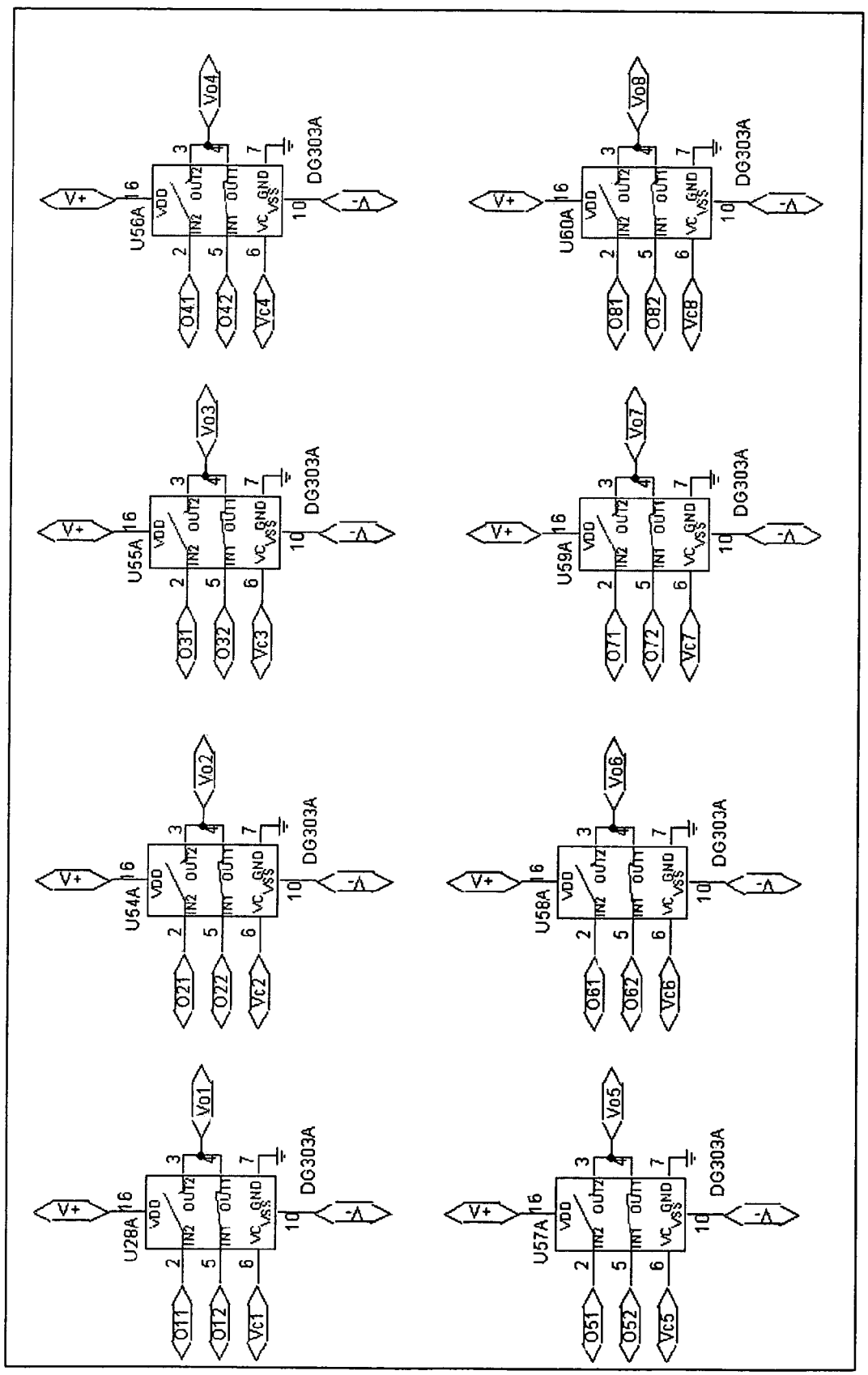
FIG. 9 is a detailed view of section I-a as shown in FIG. 8.

Section I-a is present in every hardware quantum gate of the invention, irrespective of the quantum algorithm to be implemented. Each multiplexer, depicted in FIG. 9 is input with a pair of components (011 and 012 for example) that are referred to vectors of the second basis having the first (leftmost) 3 qubits in common (|0000> and |0001>), and generates a respective component (Vo1) which is equal to 011 if Vc1 represents a null value of function f(.) on vector |000>, or to 012 if Vc1 represents a non-null value.

Sections I-b and I-c depicted in FIG. 8 are specifically designed for Grover's quantum algorithms. The presence of tensor products in the interference operation, whose number increases dramatically with the dimensions, forms a critical point.

Sections I-b and I-c of FIG. 8 of the quantum gate allow the interference operation of Grover's quantum algorithm to be quickly carried out. It has been noticed that the matrix $D_n I$ has the following properties: odd columns (or rows, because $D_n I$ is symmetric) have non-zero odd components and even columns have non-zero even components. The value of all non-zero components, except for the $i^{th}$ component of $i^{th}$ column (diagonal elements), is $\frac{1}{2}^{n-1}$. The components on the up-left down-right diagonal of the matrix differ from the other non-zero components because they are decreased by 1. The variable G* in an entanglement vector, and the output vector of the quantum algorithm $V=(D_n I)G^*$ involves only a suitable weighted sum of components of G*. The value $\frac{1}{2}^{n-1}$ depends only from the number n of qubits.

From the above analysis, the generic element $v_i$ of V can be written as follows as a function of components $g^*_i$ of the entanglement vector G*:

$$v_i = \begin{cases} \frac{1}{2^{n-1}} \sum_{j=1}^{2^n} g^*_{2j-1} - g^*_i & \text{for } i \text{ odd} \\ \frac{1}{2^{n-1}} \sum_{j=1}^{2^n} g^*_{2j} - g^*_i & \text{for } i \text{ even} \end{cases} \quad (16)$$

Therefore, to calculate a component $v_i$ of the output vector it is sufficient to calculate a weighted sum of even $$(\frac{1}{2^{n-1}} \sum_{j=1}^{2^n} g^*_{2j})$$

or odd $$(\frac{1}{2^{n-1}} \sum_{j=1}^{2^n} g^*_{2j-1})$$

components of the entanglement vector and to subtract from it the corresponding component $g^*_i$ of the entanglement vector.

Figure 10:
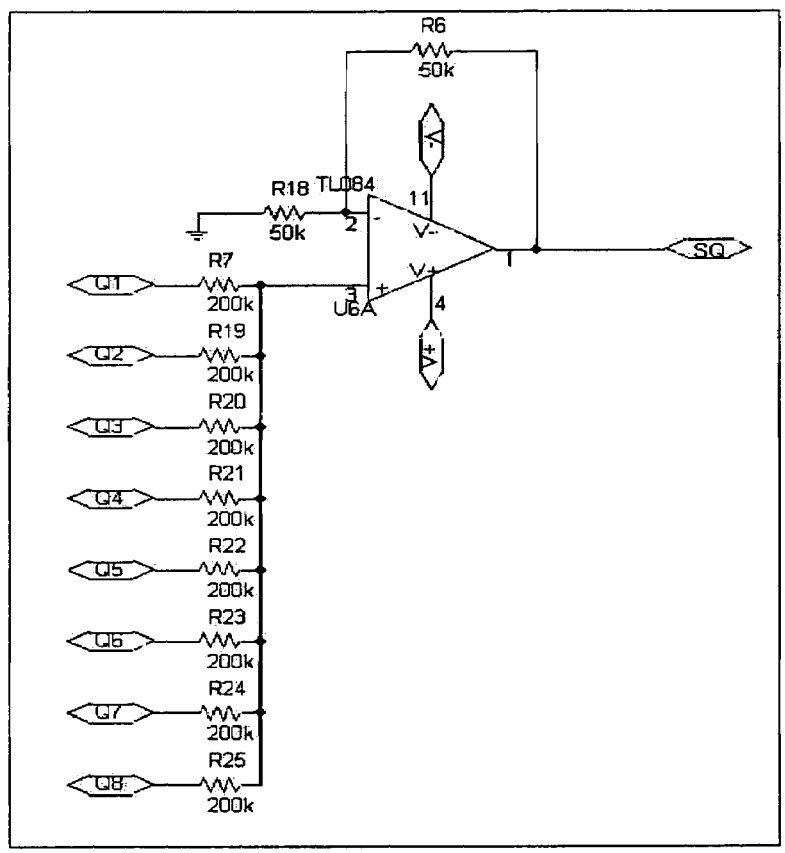
FIG. 10 is an embodiment of the section I-b as shown in FIG. 8.

An adder HB25, depicted in greater detail in FIG. 10, sums these components with a certain scale factor that depends only on the number n of qubits (which is 0.25 for n=3), and generates a signal SQ representing the sum of the odd (or even) components of the entanglement vector. Finally, an array of adders I-c generates signals 01, . . . , 08 representing the odd (or even) components of an output vector by subtracting the signals Q1, . . . , Q8 from the scaled sum SQ.

A hardware quantum gate of the invention for carrying out a Deutsch-Jozsa's quantum algorithm does not have the sections I-b and I-c of FIG. 8 for performing the interference operation. In this case, the interference subsystem is substantially composed of an array of adders, each calculating a respective component 01, . . . , 08 of the output vector as a linear combination of components Vo1, . . . , Vo8 of a corresponding entanglement vector.

It is not necessary to calculate all components of the entanglement or output vectors, because the odd components of any vector are always opposite to the even components. For this reason entanglement and interference operations are carried out only on the odd or even components. The other components are calculated by inverting the first ones.

Figure 11:
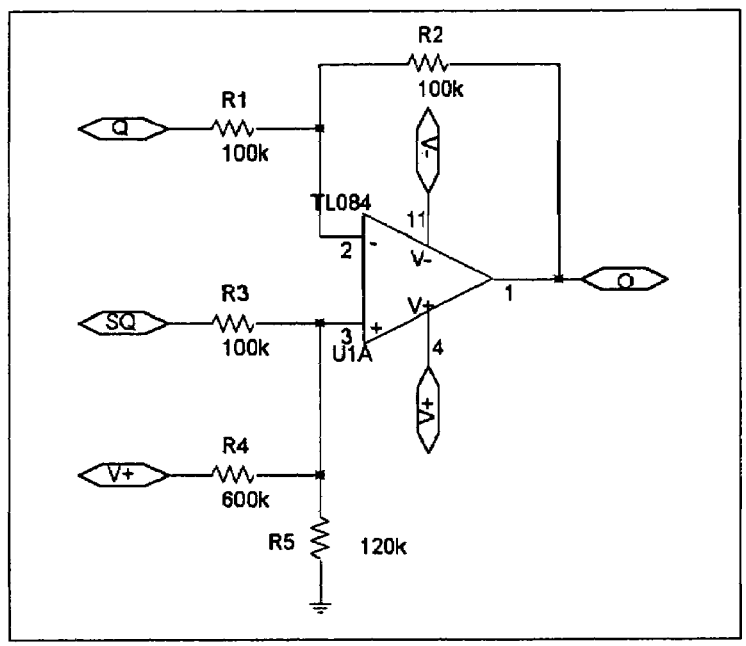
FIG. 11 is an embodiment of an adder as shown section I-c of FIG. 8.

The adders of section I-c may be formed, for instance, as depicted in FIG. 11. A voltage of 2.5V is added to transpose the value inside the range [0÷5]V of A/D converters that interface with Part II (digital part).

To provide better performances, a different range of probability amplitudes is chosen. The presence of converters, whose range is [0÷5]V, suggests adoption of a range of [−2.5÷2.5] instead of [−1/√2÷1/√2]. This implies that the output is not normalized to 1 but to 2*2.5²=12.5.

Figure 12:
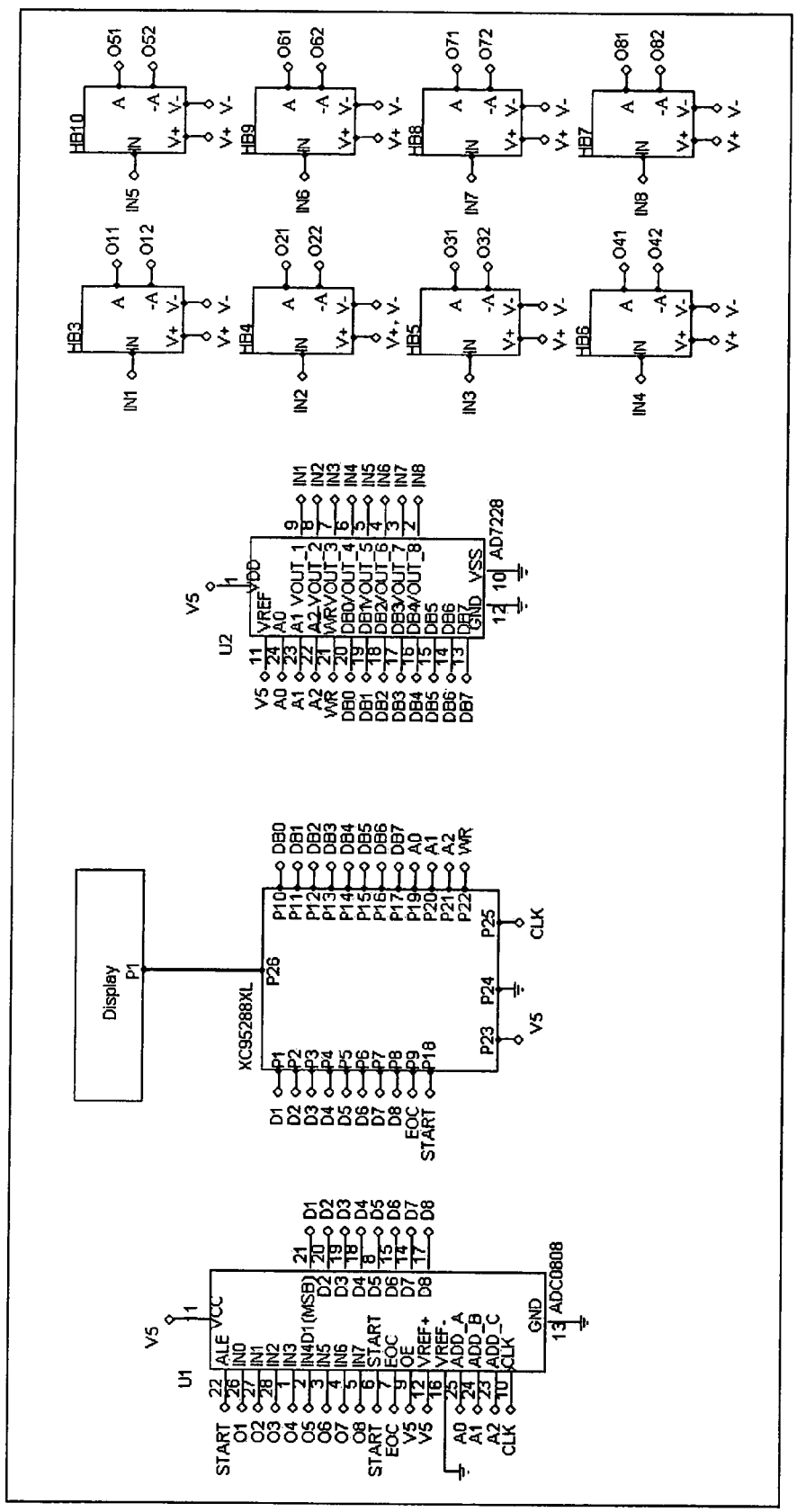
FIG. 12 is a detailed view of the digital section of the quantum gate in accordance with the present invention.

Because of the necessity of different types of operations (storing values, entropy evaluation and stopping iteration) for performing the Grover's algorithm, a microprocessor unit has been chosen as the core of Part II. For instance, an appropriate microprocessor unit may be the commercial device CPLD XC95288XL of STMicroelectronics, as depicted in FIG. 12.

An analog/digital converter, which may be for example the A/D converter ADC0808 of STMicroelectronics, receives signals representing components $01, \ldots, 08$ of the output vector and produces a corresponding binary string $D1, \ldots, D8$. The microprocessor unit XC95288XL receives this string and calculates the Shannon entropy.

Summarizing, the microprocessor unit performs the following functions:
1. Drives correctly the A/D converter.
2. Acquires eight digital values and evaluates Shannon entropy S.
3. Compares S with a fixed threshold.
4. If S<threshold, stops iteration and sends the results to LED Matrix display; otherwise sends the results to a digital/analog converter.
5. Provide initial condition of superposed basis vectors.

A display may also be connected to the CPLD to display the result. If Shannon entropy is not a minimum, the binary string has to be re-converted in an analog signal by a digital/analog converter for it to feedback into the entanglement subsystem I-a. In the preferred embodiment of FIG. 12, the digital/analog converter is the commercial device AD7228 of STMicroelectronics.

Figure 13:
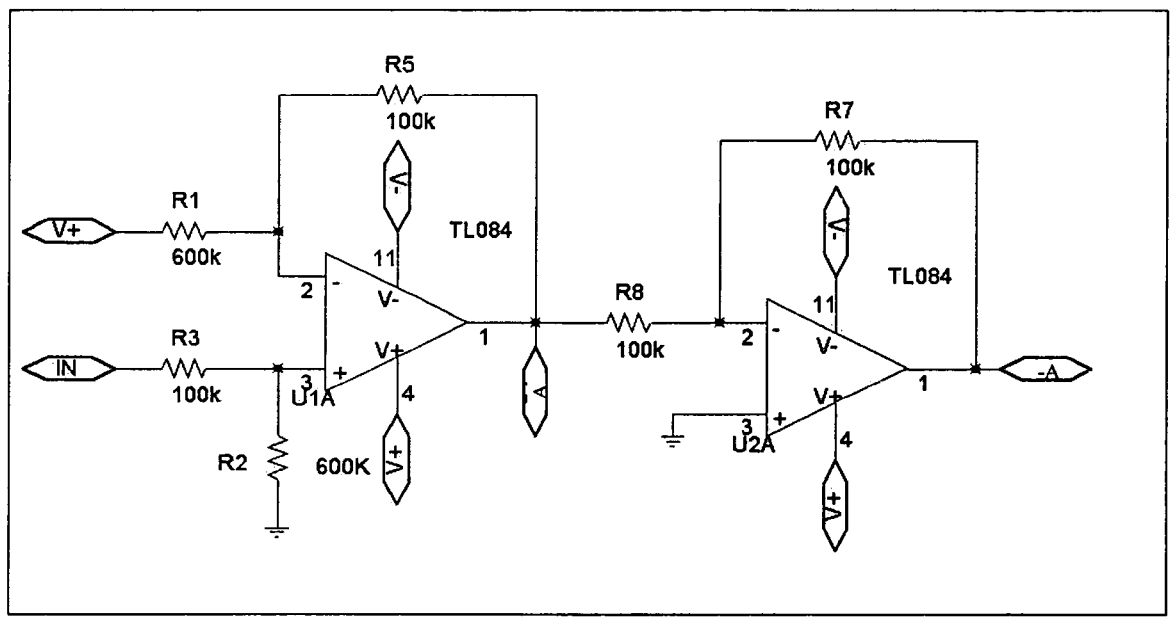
FIG. 13 is one possible embodiment of the level shifters as shown in FIG. 12.

The level shifters $HB3, \ldots, HB10$, which can be formed as depicted in FIG. 13, re-translate the values of $IN1, \ldots, IN8$ into the range $[-2.5 \div 2.5]$ and re-obtain all components from odd components. The iterations are carried out very fast, according to the CPLD frequency ($20 \div 30$ MHz). This fact suggests that very high performances could be reached even with a greater number of qubits, resulting in a very efficient search in a large database.

That which is claimed is:

1. A processing device for implementing a quantum gate for running a quantum algorithm for searching elements in a database using a binary function having a first basis of vectors of n qubits, the processing device comprising:
   a superposition subsystem for performing a superposition operation over components of input vectors for generating components of linear superposition vectors for a second basis of vectors of n+1 qubits;
   an entanglement subsystem for performing an entanglement operation over components of the linear superposition vectors for generating components of entanglement vectors, said entanglement subsystem comprising
      a command circuit for generating a plurality of logic command signals encoding values of the binary function corresponding to the first basis of vectors, and
      an array of multiplexers, each being driven by a respective logic command signal and receiving as input a plurality of signals representing components of a linear superposition vector corresponding to the second basis of vectors having the first n qubits in common, and outputting for each superposition vector corresponding signals representing components of an entanglement vector, each component of the entanglement vector corresponding to a respective vector of the second basis of vectors and being equal to
         the corresponding component of the respective superposition vector if the binary function is null in correspondence to the vector of the first basis of vectors formed by the first n qubits of the respective vector of the second basis of vectors, or
         the opposite of the corresponding component of the respective superposition vector if the binary function is not a null in correspondence to the vector of the first basis of vectors formed by the first n qubits of the respective vector of the second basis of vectors; and
   an interference subsystem for performing an interference operation over components of the entanglement vectors for generating components of output vectors representing the elements searched in the database.

2. A quantum gate according to claim 1, wherein the quantum algorithm comprises a Grover's quantum algorithm, and wherein said interference subsystem comprises:
   an adder receiving as input voltage signals representing even or odd components of an entanglement vector, and generating a sum signal representing a weighed sum with a scale factor of the even or odd components of the entanglement vector; and
   an array of adders each receiving as input a respective signal representing an even or odd component of an entanglement vector and the sum signal, and generating a signal representing an even or odd component of the output vector as a difference between the sum signal and the signal representing an even or odd component of the entanglement vector.

3. A quantum gate according to claim 2, further comprising an elaboration subsystem comprising:
   an analog/digital converter receiving as input the signals representing the even or odd components of the output vector and for converting the input signals into a digital string; and
   a microprocessor unit receiving as input the digital string for performing the following
      calculating a quantity to be minimized that is associated with the odd or even components of the output vector,
      comparing the quantity to be minimized with a threshold and stopping the Grover's algorithm if the quantity is smaller than the threshold, otherwise commanding another iteration, and
      generating an output digital string representing components of the output vector.

4. A quantum gate according to claim 3, wherein said elaboration subsystem further comprises:
   a digital/analog converter receiving as input the output digital string, and generating output signals corresponding to the odd or even components of the output vector; and
   an array of level shifters, each being input with a respective output signal, and generating a pair of voltage signals in a desired voltage range representing opposite components of a new superposition vector to be input to said entanglement subsystem.

5. A quantum gate according to claim 4, wherein each level shifter comprises:
   an adder that subtracts a predetermined voltage from a respective output signal for generating an odd component of the new superposition vector; and
   an inverter receiving as input the odd component for generating the corresponding even component.

6. A quantum gate according to claim 3, wherein the quantity to be minimized comprises a Shannon entropy.

7. A quantum gate According to claim 1, wherein the quantum algorithm comprises a Deutsch-Jozsa's quantum algorithm, and wherein said interference subsystem comprises an array of adders each receiving as input signals representing even or odd components of an entanglement vector, and generating a signal representing a corresponding even or odd component of the output vector as a linear combination of the signals representing the even or odd components of the entanglement vector.

8. A processing device for implementing a quantum gate for running a Grover's quantum algorithm for searching elements in a database using a binary function having a first basis of vectors of n qubits, the processing device comprising:
- a superposition subsystem for performing a superposition operation over components of input vectors for generating components of linear superposition vectors for a second basis of vectors of n+1 qubits;
- an entanglement subsystem for performing an entanglement operation over components of the linear superposition vectors for generating components of entanglement vectors, said entanglement subsystem comprising
  - a command circuit for generating a plurality of logic command signals encoding values of the binary function corresponding to the first basis of vectors, and
  - an array of multiplexers, each being driven by a respective logic command signal and receiving as input a plurality of signals representing components of a linear superposition vector corresponding to the second basis of vectors having the first n qubits in common, and outputting for each superposition vector corresponding signals representing components of an entanglement vector; and
- an interference subsystem for performing an interference operation over components of the entanglement vectors for generating components of output vectors representing the elements searched in the database.

9. A quantum gate according to claim 8, wherein each component of the entanglement vector corresponding to a respective vector of the second basis of vectors is equal to the corresponding component of the respective superposition vector if the binary function is null in correspondence to the vector of the first basis of vectors formed by the first n qubits of the respective vector of the second basis of vectors, or the opposite of the corresponding component of the respective superposition vector if the binary function is not a null in correspondence to the vector of the first basis of vectors formed by the first n qubits of the respective vector of the second basis of vectors.

10. A quantum gate according to claim 8, wherein said interference subsystem comprises:
- an adder receiving as input voltage signals representing even or odd components of an entanglement vector, and generating a sum signal representing a weighed sum with a scale factor of the even or odd components of the entanglement vector; and
- an array of adders each receiving as input a respective signal representing an even or odd component of an entanglement vector and the sum signal, and generating a signal representing an even or odd component of the output vector as a difference between the sum signal and the signal representing an even or odd component of the entanglement vector.

11. A quantum gate according to claim 10, further comprising an elaboration subsystem comprising:
- an analog/digital converter receiving as input the signals representing the even or odd components of the output vector and for converting the input signals into a digital string; and
- a microprocessor unit receiving as input the digital string for performing the following
  - calculating a quantity to be minimized that is associated with the odd or even components of the output vector,
  - comparing the quantity to be minimized with a threshold and stopping the Grover's algorithm if the quantity is smaller than the threshold, otherwise commanding another iteration, and
  - generating an output digital string representing components of the output vector.

12. A quantum gate according to claim 11, wherein said elaboration subsystem further comprises:
- a digital/analog converter receiving as input the output digital string, and generating output signals corresponding to the odd or even components of the output vector; and
- an array of level shifters, each being input with a respective output signal, and generating a pair of voltage signals in a desired voltage range representing opposite components of a new superposition vector to be input to said entanglement subsystem.

13. A quantum gate according to claim 12, wherein each level shifter comprises:
- an adder that subtracts a predetermined voltage from a respective output signal for generating an odd component of the new superposition vector; and
- an inverter receiving as input the odd component for generating the corresponding even component.

14. A quantum gate according to claim 11, wherein the quantity to be minimized comprises a Shannon entropy.

15. A processing device for implementing a quantum gate for running a Deutsch-Jozsa's quantum algorithm for searching elements in a database using a binary function having a first basis of vectors of n qubits, the processing device comprising:
- a superposition subsystem for performing a superposition operation over components of input vectors for generating components of linear superposition vectors for a second basis of vectors of n+1 qubits;
- an entanglement subsystem for performing an entanglement operation over components of the linear superposition vectors for generating components of entanglement vectors, said entanglement subsystem comprising
  - a command circuit for generating a plurality of logic command signals encoding values of the binary function corresponding to the first basis of vectors, and
  - an array of multiplexers, each being driven by a respective logic command signal and receiving as input a plurality of signals representing components of a linear superposition vector corresponding to the second basis of vectors having the first n qubits in common, and outputting for each superposition vector corresponding signals representing components of an entanglement vector; and
- an interference subsystem for performing an interference operation over components of the entanglement vectors for generating components of output vectors representing the elements searched in the database.

16. A quantum gate according to claim 15, wherein each component of the entanglement vector corresponding to a respective vector of the second basis of vectors is equal to the corresponding component of the respective superposition vector if the binary function is null in correspondence to the vector of the first basis of vectors formed by the first n qubits of the respective vector of the second basis of vectors, or the opposite of the corresponding component of the respective superposition vector if the binary function is not a null in correspondence to the vector of the first basis of vectors formed by the first n qubits of the respective vector of the second basis of vectors.

17. A method for operating a processing device comprising a superposition subsystem, an entanglement subsystem and an interference subsystem for running a quantum algorithm for searching elements in a database using a binary function having a first basis of vectors of n qubits, the method comprising:
  performing a superposition operation with the superposition subsystem over components of input vectors for generating components of linear superposition vectors for a second basis of vectors of n+1 qubits;
  performing an entanglement operation with the entanglement subsystem over components of the linear superposition vectors for generating components of entanglement vectors, the entanglement operation comprising
    generating a plurality of logic command signals encoding values of the binary function corresponding to the first basis of vectors, and
    driving an array of multiplexers by respective logic command signals and applying as input to the array of multiplexers a plurality of signals representing components of a linear superposition vector corresponding to the second basis of vectors having the first n qubits in common, and outputting for each superposition vector corresponding signals representing components of an entanglement vector, each component of the entanglement vector corresponding to a respective vector of the second basis of vectors and being equal to
      the corresponding component of the respective superposition vector if the binary function is null in correspondence to the vector of the first basis of vectors formed by the first n qubits of the respective vector of the second basis of vectors, or
      the opposite of the corresponding component of the respective superposition vector if the binary function is not a null in correspondence to the vector of the first basis of vectors formed by the first n qubits of the respective vector of the second basis of vectors; and
  performing an interference operation with the interference subsystem over components of the entanglement vectors for generating components of output vectors corresponding to the elements searched in the database.

18. A method according to claim 17, wherein the quantum algorithm comprises a Grover's quantum algorithm; and wherein the interference subsystem comprises:
  an adder receiving as input voltage signals representing even or odd components of an entanglement vector, and generating a sum signal representing a weighed sum with a scale factor of the even or odd components of the entanglement vector; and
  an array of adders each receiving as input a respective signal representing an even or odd component of an entanglement vector and the sum signal, and generating a signal representing an even or odd component of the output vector as a difference between the sum signal and the signal representing an even or odd component of the entanglement vector.

19. A method according to claim 18, further comprising:
  receiving as input the signals representing the even or odd components of the output vector, and converting the input signals into a digital string; and
  performing the following based upon the digital string
    calculating a quantity to be minimized that is associated with the odd or even components of the output vector,
    comparing the quantity to be minimized with a threshold and stopping the Grover's algorithm if the quantity is smaller than the threshold, otherwise commanding another iteration, and
    generating an output digital string representing components of the output vector.

20. A method according to claim 19, further comprising:
  generating output signals corresponding to the odd or even components of the output vector; and
  using an array of level shifters, each being input with a respective output signal, and generating a pair of voltage signals in a desired voltage range representing opposite components of a new superposition vector to be input to an entanglement subsystem performing the entanglement operations.

21. A method according to claim 20, wherein each level shifter comprises:
  an adder that subtracts a predetermined voltage from a respective output signal for generating an odd component of the new superposition vector; and
  an inverter receiving as input the odd component for generating the corresponding even component.

22. A method according to claim 19, wherein the quantity to be minimized comprises a Shannon entropy.

23. A method according to claim 17, wherein the quantum algorithm comprises a Deutsch-Jozsa's quantum algorithm; and wherein the interference subsystem comprises an array of adders each receiving as input signals representing even or odd components of an entanglement vector, and generating a signal representing a corresponding even or odd component of the output vector as a linear combination of the signals representing the even or odd components of the entanglement vector.

* * * * *

UNITED STATES PATENT AND TRADEMARK OFFICE
CERTIFICATE OF CORRECTION

PATENT NO.       : 7,359,928 B2
APPLICATION NO.  : 10/701150
DATED            : April 15, 2008
INVENTOR(S)      : Domenico Porto, Marco Branciforte and Lucio Tecli It is certified that error appears in the above-identified patent and that said Letters Patent is hereby corrected as shown below:

| | |
|---|---|
| Column 2, Line 55 | Delete: "infective"<br>Insert: --injective-- |
| Column 3, Line 16 | Delete: "hk"<br>Insert: --$h \cdot k$-- |
| Column 3, Line 26 | Delete: "number,"<br>Insert: --number),-- |
| Column 3, Line 28 | Delete: "joing"<br>Insert: --joint-- |
| Column 3, Line 67 | Delete: "U$_F$\j>=\i>"<br>Insert: -- $U_F |j\rangle = |i\rangle$ -- |
| Column 5, Eq. 6 | Delete: "D$_n$I"<br>Insert: --$D_n \otimes I$-- |
| Column 6, Line 36 | Delete: "\|0010>"<br>Insert: -- $|0010\rangle$ -- |
| Column 6, Line 36 | Delete: "\|0111>"<br>Insert: -- $|0111\rangle$ -- |
| Column 6, Line 53 | Delete: "\|011>"<br>Insert: -- $|011\rangle$ -- |
| Column 7, Line 6 | Delete: "\|011>"<br>Insert: -- $|011\rangle$ -- |
| Column 7, Line 13 | Delete: "D$_n$I"<br>Insert: --$D_n \otimes I$-- |
| Column 9, Line 41 | Delete: "\|0000> and \|0001>"<br>Insert: -- $|0000\rangle$ and $|0001\rangle$ -- |
| Column 9, Line 44 | Delete: "\|000>"<br>Insert: -- $|000\rangle$ -- |

UNITED STATES PATENT AND TRADEMARK OFFICE
CERTIFICATE OF CORRECTION

PATENT NO. : 7,359,928 B2
APPLICATION NO. : 10/701150
DATED : April 15, 2008
INVENTOR(S) : Domenico Porto, Marco Branciforte and Lucio Tecli It is certified that error appears in the above-identified patent and that said Letters Patent is hereby corrected as shown below:

Column 9, Line 53   Delete: "$D_n I$"
                    Insert: --$D_n \otimes I$--

Column 9, Line 55   Delete: "$D_n I$"
                    Insert: --$D_n \otimes I$--

Column 9, Line 58   Delete: "$½^{n-1}$"
                    Insert: --$1/2^{n-1}$--

Column 9, Line 62   Delete: "$D_n I$"
                    Insert: --$D_n \otimes I$--

Column 9, Line 64   Delete: "$½^{n-1}$"
                    Insert: --$1/2^{n-1}$--

Column 10, Line 62  Delete: " $[-1/\sqrt{2} \div 1/\surd, \sqrt{2}\,]$ "
                    Insert: -- $[-1/\sqrt{2} \div 1/\sqrt{2}\,]$ --

Column 12, Line 65  Delete: "According"
                    Insert: --according--

Signed and Sealed this

Seventh Day of October, 2008

JON W. DUDAS
*Director of the United States Patent and Trademark Office*